Figure 6:
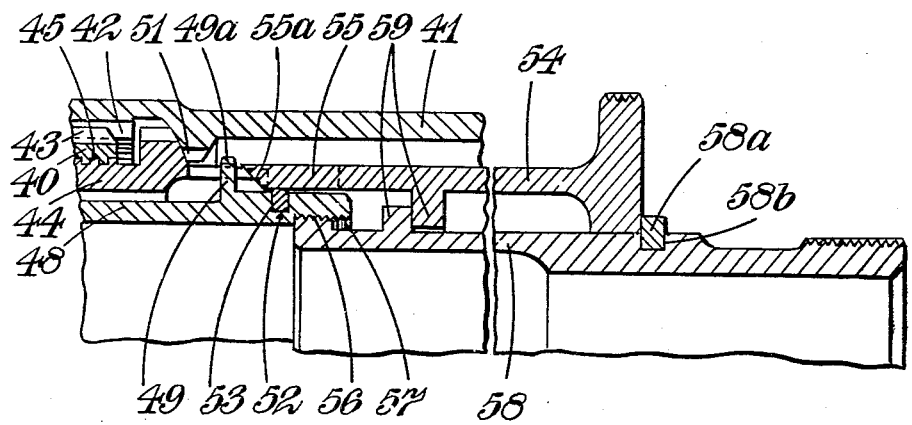

May 27, 1958     J. A. PETRIE     2,836,041
LOCKING MEANS FOR PARTS HAVING THREADED ENGAGEMENT
Filed Nov. 14, 1955     3 Sheets-Sheet 1
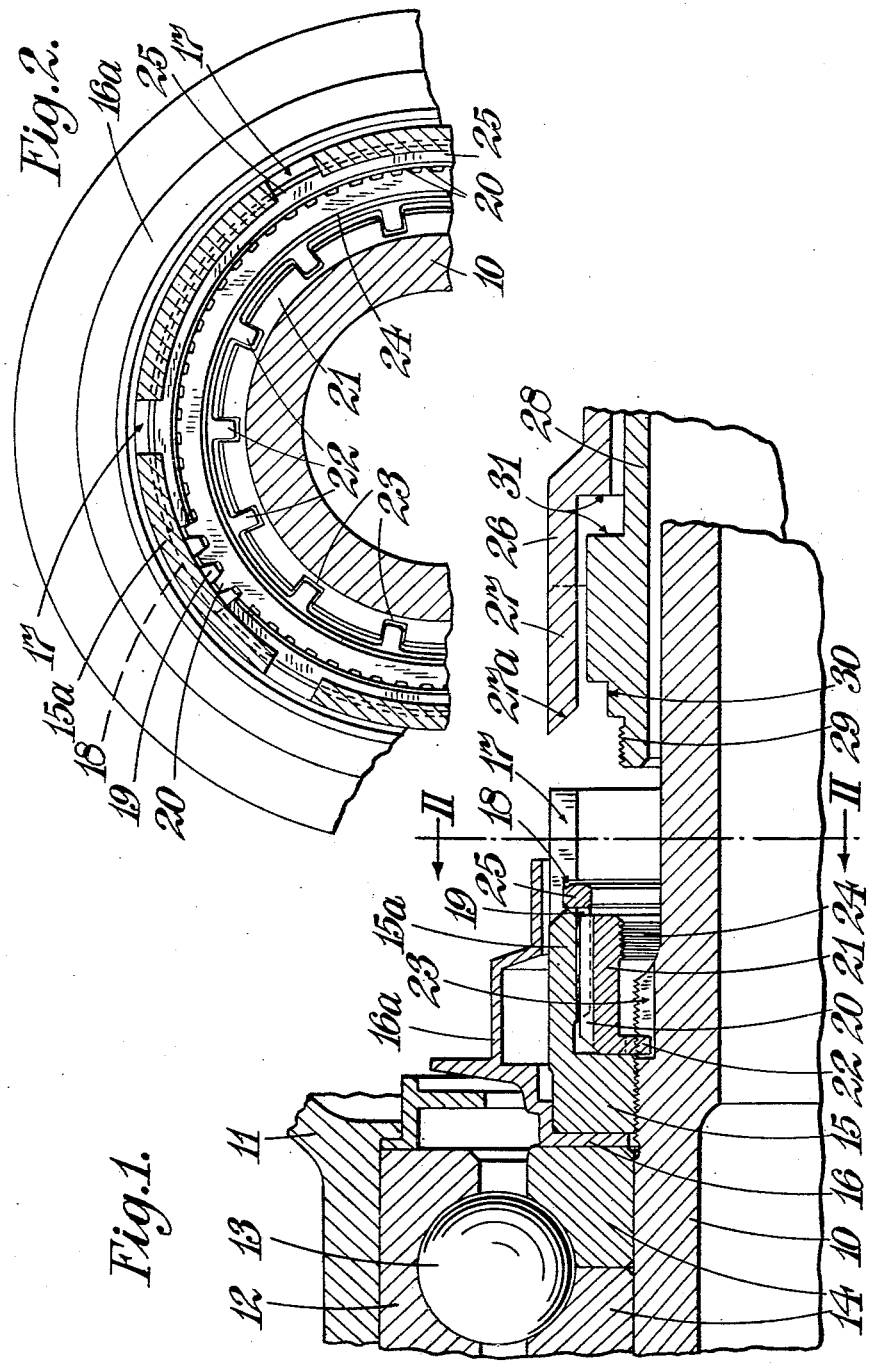

May 27, 1958 J. A. PETRIE 2,836,041
LOCKING MEANS FOR PARTS HAVING THREADED ENGAGEMENT
Filed Nov. 14, 1955 3 Sheets-Sheet 2
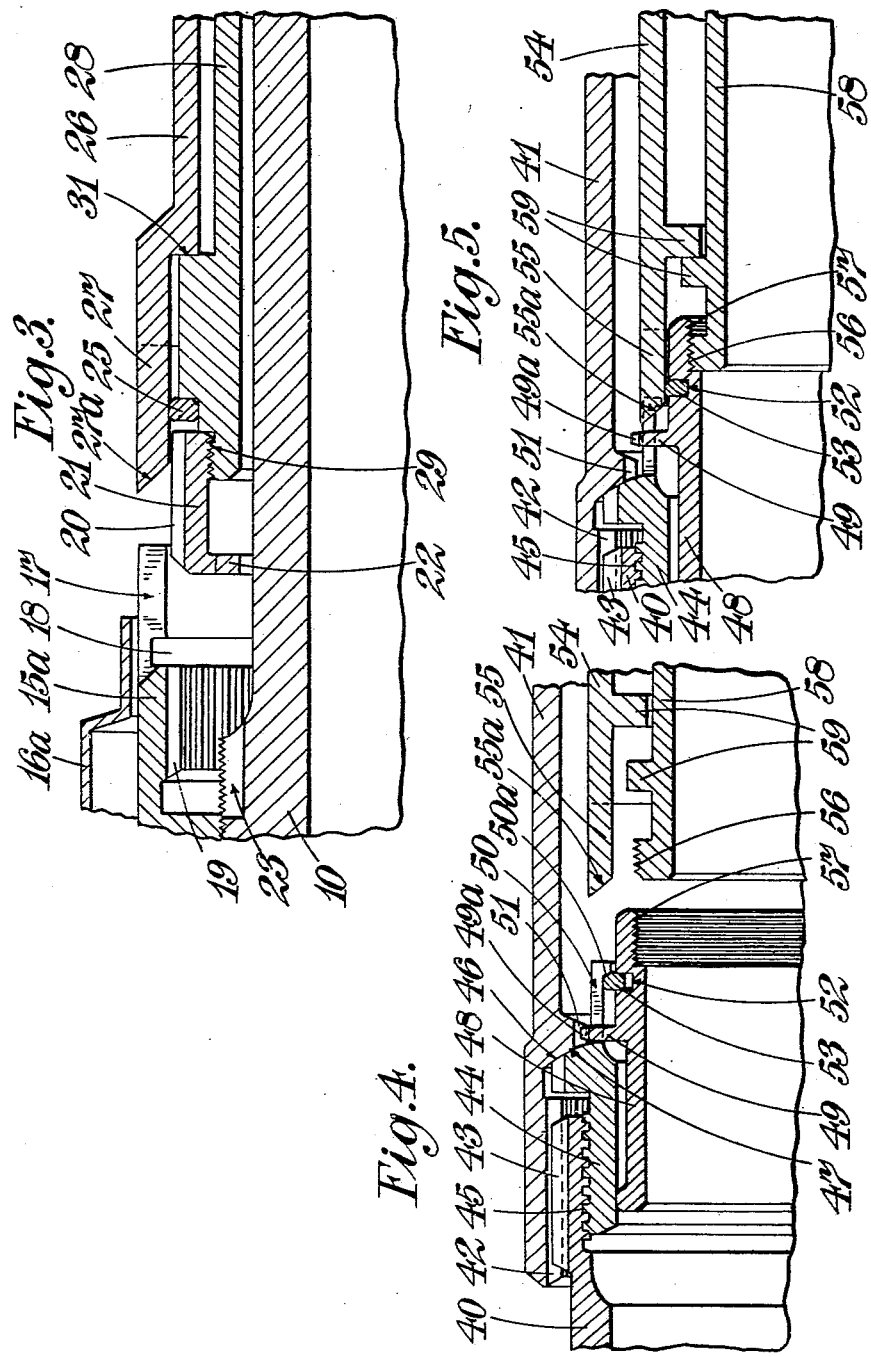

May 27, 1958 J. A. PETRIE 2,836,041
LOCKING MEANS FOR PARTS HAVING THREADED ENGAGEMENT
Filed Nov. 14, 1955 3 Sheets-Sheet 3

INVENTOR

JAMES ALEXANDER PETRIE

BY MAWHINNEY AND MAWHINNEY

ATTORNEYS

United States Patent Office 2,836,041
Patented May 27, 1958

2,836,041

LOCKING MEANS FOR PARTS HAVING THREADED ENGAGEMENT

James Alexander Petrie, Littleover, England, assignor to Rolls-Royce Limited, Derby, England, a British company Application November 14, 1955, Serial No. 546,695

Claims priority, application Great Britain November 22, 1954

4 Claims. (Cl. 64—9)

This invention relates to locking means for use in restraining relative rotation of parts interengaged by screw threads and has for an object to provide a form of locking means suitable for use in positions which are difficult of access.

According to the present invention, there is provided in combination a first part, a second part having a screw thread engagement with the first part, and locking means to lock the parts together comprising a sleeve having a splined or the like connection with each of said parts thereby to restrain relative rotation thereof, said sleeve being restrained against axial displacement in one sense at least with respect to said first part by radially- and resiliently-deformable means having axial abutment with the sleeve and with the first part, said first part having axial slots at the position of the radially- and resiliently-deformable means adapted to receive axial tongues of an axially-engageable tool whereby the radially- and resiliently-deformable means can be displaced from its locking position, and said sleeve being adapted for engagement by a coaxial tool to enable withdrawal of the sleeve.

In use, the coaxial tool may first be engaged with the sleeve and the tongued tool then moved axially into the slots thereby to displace the radially- and resiliently-deformable means and to unlock the sleeve. The coaxial tool may then be displaced axially to withdraw the sleeve from its splined or like connection with a threaded part so permitting relative rotation of the threaded parts by the tongued tool.

Preferably the radially- and resiliently-deformable means is a split ring which is received partly within a groove in the said one of the parts or in the sleeve and is contracted by the tongues to displace it from the groove when the groove is in one of the parts or to displace it into the groove when the groove is in the sleeve.

Two applications of this invention will now be described with reference to the accompanying drawings, in which—

Figure 1 is an axial section showing a shaft supported by a bearing, part of which bearing is locked to the shaft by locking means in accordance with the invention, Figure 2 is a section on the line 2—2 of Figure 1, Figure 3 s a view similar to Figure 1 with parts in different positions, Figure 4 is an axial section through a torque-transmitting shaft coupling whereof parts are locked together by locking means in accordance with the invention, Figure 5 is a view similar to Figure 4 showing partial disengagement of the locking means, and Figure 6 is a view similar to Figure 5 showing the tool in more detail.

Referring first to Figures 1 to 3, there is illustrated a shaft 10, which may be the turbine shaft or compressor shaft of a gas-turbine engine, supported by a bearing in fixed structure 11, the bearing including a fixed race 12, a ring of balls 13 and a two-part inner race 14. The two parts of the inner race 14 are held in abutment with one another and axially in position against an abutment (not shown) on the shaft 10 by means of a locking nut 15 threaded on the shaft 10, between which and the parts 14 there is located an annular member 16 having an axial flange 16a shrouding the locking nut 15.

It will be appreciated that insertion and removal of the locking nut 15 is difficult not only because the nut is shrouded but also because the shaft 10 extends well beyond the accessible end of the nut 15.

In order to facilitate engagement and disengagement of the locking nut 15 and to prevent its accidental disengagement in operation, the following arrangement is employed.

The locking nut 15 is provided with an axial annular extension 15a which projects axially outside the shroud 16a and is spaced radially from the shaft 10. The extension 15a is formed with a number, say six, of axially-extending circumferentially-spaced slots 17 which extend to the edge of the extension 15a remote from the nut 15. The extension 15a is also formed at the level of the blind ends of the slots 17 with an internal circumferential groove 18, the purpose of which will appear below. The extension 15a is also provided internally between the groove 18 and the nut 15 with axially-extending splines 19.

The splines 19 are engaged by external splines 20 on a sleeve-like locking member 21 which is accommodated in the space between the extension 15a and the shaft 10, and the sleeve-like locking member is also provided internally with a series of radially-inward projections 22 which engage in axial grooves 23 in the threaded portion of the shaft 10 which receives the nut 15. The number of splines 19 and inward projections 22 are selected to give a vernier effect enabling the projections 22 to be engaged in grooves 23 with the nut 15 screwed fully home. The sleeve-like locking member 21 is also internally screw-threaded at 24. The member 21 has an axial length substantially equal to the distance of the groove 18 from the nearer axially-facing surface of the nut 15.

The groove 18 is occupied by a split ring 25 which has a radial extent to project radially-inwards from the groove 18 so to provide an abutment which prevents the sleeve-like locking member 21 from being disengaged axially from the splines 19 and from the grooves 23.

It will be seen that the member 21 through its splines 20 and radially-inward projections 22 prevents relative rotation of the nut 15 on the shaft 10 and that the sleeve-like locking member 21 is locked axially in one sense by abutment of its left-hand end with the nut 15 and in the opposite sense by the split ring 25.

The nut 15 and locking member 21 may be assembled and removed by means of a tool indicated at the right-hand end of Figures 1 and 3. The tool comprises a first tubular part 26 having at its end a series of axially-directed tongues 27 which are adapted to enter the slots 17 and to engage by their chamfered edges 27a with the split ring 25 to cause it to contract and to displace it from the groove 18. The tool also comprises a second tubular member 28 which is arranged coaxially within the tubular member 26 and has at its end a threaded portion 29 to engage the thread 24 of the sleeve-like locking member 21 and has a shouldered seat 30 to receive the split ring 25. The two tool parts have abutting shoulders 31 to limit their axial displacement.

In order to remove the sleeve-like locking member 21 and the nut 15, the tool part 28 is first connected to the sleeve-like locking member 21 through the threads 24, 29, the tool part 36 is then moved axially to bring its tongues 27 into the slots 17 and to contract radially the split ring 25 on to the seat 30, the tool part 28 is then withdrawn axially to bring the shoulders 31 into abutment and to trap the split ring 25 between its seat 30 and the tongues 27, and the tool parts 28, 26 are then with-drawn together so disengaging the splines 19, 20 and the projections 22 from the grooves 23, leaving the nut 15 free for rotation on the shaft 10. If it is also desired to withdraw the nut 15 the tool parts 26, 28 are withdrawn only to an extent sufficient to disengage the splines 20 and projections 22 of the sleeve-like locking member 21 from engagement with splines 19 and grooves 23 whilst leaving the tongues 27 partially engaged with the slots 17. Rotation of the tool parts will then rotate the nut 15 on its thread relative to the shaft 10. Normally, however, the nut is rotated by a tool engaging the splines 19.

Referring now to Figures 4 and 5, there is illustrated a coupling between two parts of a shaft which may, for instance, be a shaft of a gas-turbine engine rotor, the one part 40 being connected say to the compressor and the other part 41 being connected to the turbine of the engine.

The coupling between the two parts 40, 41 is not only torque transmitting but is also capable of accommodating misalignment between the shaft parts 40, 41. The coupling comprises internal splines 42 at the end of the shaft part 41 engaging splines 43 on the adjacent end of the shaft part 40 (the splines 42 and 43 may be helical) and also comprises a third member 44 which has a threaded engagement at 45 with the shaft part 40 and bears on a part-spherical shoulder 46 on the shaft part 41 through a corresponding part-spherical surface 47. In order to adjust the axial positions of the shaft parts 40, 41 the member 44 is rotated along its screw thread relative to the part 40 so displacing axially the engaging spherical surfaces 46, 47.

The member 44 is locked to the shaft part 40 in the following way.

In order to prevent relative rotation of the member 44 with respect to the part 40, there is provided a sleeve 48 internally of the member 44, the sleeve having radial projections 49 to engage in axial slots 50 formed in an axial extension of the member 44. The radial projections terminate at their outer ends in teeth 49a to interengage with internal teeth 51 on the member 41. The projections 49 and their teeth 49a by co-operating with the slots 50 and teeth 51 prevent rotation of the member 44 relative to the shaft part 41 and, since the shaft part 41 has a splined engagement with the shaft part 40, the member 44 is also prevented from rotating relative to the shaft part 40.

In order to lock the sleeve 48 axially with respect to the member 44 the following arrangement is adopted.

The end of the slotted extension of the member 44 is provided with an inturned lip 50a and there is formed in the sleeve 48 an external circumferential groove 52 which receives a split ring 53. The position of the groove 52 is such that, when the projections 49 are at the closed ends of the slots 50, the groove 52 is just on the side of the lip 50a nearer the projections 49. Thus when the split ring 53 is expanded, it abuts axially the side of the lip 50a which faces to the left and the side wall of the groove 52 which faces to the right and prevents movement of the sleeve 48 to the right, as viewed in the drawings. Movement to the left of the sleeve 48 is prevented by the projections 49 coming up against the ends of the slots 50.

In order to insert and remove the sleeve 48 and to adjust the member 44 axially relative to the part 40, a two-part tool is used similar to that illustrated in Figures 1 to 3.

The tool comprises a first tubular part 54 having at one end axial tongues 55 terminating in chamfered ends 55a, the tongues being adapted to enter the slots 50 and to compress the split ring 53 to move it radially clear of the shoulder afforded by the inturned lip 50a and having at its other end a knurled flange. The second part 58 of the tool is also hollow and is accommodated within the first part 54 and it is provided at one end with a threaded portion 56 to engage an internal thread 57 on the sleeve 48 to enable the sleeve to be withdrawn axially, and at its other end with a knurled grip. The parts 54, 58 are also provided with abutment shoulders 59 to limit their axial movement in one direction.

In order to adjust the axial positions of the shaft parts 40, 41 the two-part tool is inserted into the shaft 41 from its end and the tool part 58 is threaded into the end of the sleeve 48. The tool part 54 is then displaced axially (to the left as seen in the drawing) relative to the tool part 58 so bringing the tongues 55 into the slots 50 and compressing the split ring 53. The tool part 58 is now moved axially relative to the tool part 54 to bring the shoulders 59 into abutment and this movement withdraws the sleeve 48 axially to disengage the teeth 49a from the teeth 51, trapping the split ring in the compressed state. The tongues 55 are, however, still engaged with the slots 50 and so by rotation of the tool, the member 44 is rotated along its screw thread so displacing the shaft part 40 relative to the shaft part 41.

If it is desired to dismantle the coupling the same operations are employed except that once the shoulders 59 of the tool are brought into abutment, the sleeve 48 is completely withdrawn axially through the shaft part 41 so leaving the coupling free for axial separation. The parts 54, 58 of the tool may be locked together for withdrawal by means of a split spring ring 58a which is received in a groove 58b in the part 58 and abuts the end of the part 54.

I claim:

1. In combination, a first hollow shaft, a second shaft projecting within said first shaft, interengaging spline formations on said first and second shafts, said second shaft being hollow at least in the region of said spline formations, an adjusting sleeve accommodated within said shafts and having threaded engagement with one of said shafts and having thereon an annular axially-facing part-spherical face, an annular axially-facing part-spherical face on the other of said shafts, said faces co-operating to transmit axial thrust between the shafts and permitting misalignment of said shafts, said spline formations on the shafts being adapted to permit such misalignment, said adjusting sleeve being formed with a plurality of circumferentially-spaced slots which are open at one end, internal circumferentially-spaced axially-extending formations on one of said shafts adjacent said slots, a locking sleeve extending within said adjusting sleeve, radially-extending formations on said locking sleeve projecting into said slots and engaging between said internal circumferentially-spaced formations to lock said shafts and adjusting sleeve against relative rotation, an axially-facing abutment surface on the adjusting sleeve at a position adjacent said slots and facing away from the open ends of the slots, a substantially oppositely-facing abutment surface on said locking sleeve, and radially and resiliently deformable means positioned between and axially abutting said abutment surfaces on said adjusting sleeve and said locking sleeve thereby to restrain said locking sleeve from axial displacement in one sense at least.

2. The combination according to claim 1, wherein the abutment surface on the locking sleeve is afforded by a side wall of a circumferential groove in the external surface of the locking sleeve, and the radially and resiliently deformable means comprises a split ring received in said groove.

3. The combination according to claim 1, comprising also a first tubular member axially displaceable within the shafts towards and away from said slots and adapted for connection to said locking sleeve, and a second tubular member slidable on the first tubular member and having a plurality of axially-spaced tongues for entering said slots when the first tubular member and the locking sleeve are connected and for engaging the radially and resiliently deformable means to deform it from engagement with the abutment face on the adjusting sleeve.

4. In combination, a first hollow shaft having adjacent one end internal axially-extending splines and at a position axially-spaced from the splines on the side thereof remote from said end an internal axially-facing part-spherical face and a ring of radially-inwardly projecting teeth; a second hollow shaft with one end projecting into said one end of the first shaft, said one end of the second shaft having external splines interengaging with the said internal splines on the first shaft and having an internal screw thread; an adjusting sleeve extending within the said ends of the shafts and having an external screw thread engaging the screw thread on the second shaft, an external axially-facing part-spherical face in abutment with said part-spherical face on the first shaft, and an axial extension on the side of the part-spherical face remote from the screw thread on the sleeve, said axial extension having a series of axial open-ended slots therein extending to the end of the extension and within said teeth on the first shaft and said axial extension having adjacent its end an abutment surface facing axially towards the part-spherical surface of the sleeve; a locking sleeve extending within the adjusting sleeve and having radial projections extending through the slots in the axial extension of the adjusting sleeve and engaging circumferentially between the radially-inwardly projecting teeth on the first shaft, and said locking sleeve also being formed externally with a circumferential groove adjacent said abutment surface; and a radially-contractible split ring which is accommodated in said groove, has a part projecting radially from the groove and has its radially-projecting part in axial abutment with said abutment surface on the adjusting sleeve.

References Cited in the file of this patent
UNITED STATES PATENTS

| | | |
|---|---|---|
| 1,030,146 | Wade | June 18, 1912 |
| 2,332,684 | Armitage | Oct. 26, 1943 |
| 2,712,740 | Boyd | July 12, 1955 |
| 2,744,395 | Massey et al. | May 8, 1956 |
| 2,785,550 | Petrie | Mar. 19, 1957 |

FOREIGN PATENTS

| | | |
|---|---|---|
| 540,815 | Germany | Dec. 30, 1931 |